US008751528B2

(12) United States Patent  
Huang

(10) Patent No.: US 8,751,528 B2  
(45) Date of Patent: Jun. 10, 2014

(54) ACCIDENT INFORMATION AGGREGATION AND MANAGEMENT SYSTEMS AND METHODS FOR ACCIDENT INFORMATION AGGREGATION AND MANAGEMENT THEREOF

(75) Inventor: Juin-Yi Huang, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 41 days.

(21) Appl. No.: 13/592,719

(22) Filed: Aug. 23, 2012

(65) Prior Publication Data

US 2013/0086109 A1 Apr. 4, 2013

(30) Foreign Application Priority Data

Sep. 30, 2011 (TW) .............................. 100135467 A

(51) Int. Cl.  
*G06F 17/30* (2006.01)
(52) U.S. Cl.  
USPC ........................................................ 707/770
(58) Field of Classification Search  
CPC ................................................ G07F 17/30132  
USPC .................... 707/2, 3, 770; 706/147; 348/144  
See application file for complete search history.

(56) References Cited

U.S. PATENT DOCUMENTS

| 8,300,104 | B2 | 10/2012 | Lin et al. | |
|---|---|---|---|---|
| 2003/0004940 | A1* | 1/2003 | Igarashi | 707/3 |
| 2007/0208681 | A1* | 9/2007 | Bucholz | 706/47 |
| 2011/0074953 | A1* | 3/2011 | Rauscher et al. | 348/144 |
| 2011/0227756 | A1 | 9/2011 | Otero et al. | |

FOREIGN PATENT DOCUMENTS

| TW | 201017592 | 5/2010 |
|---|---|---|
| TW | 201103786 | 2/2011 |
| TW | M410314 | 8/2011 |

OTHER PUBLICATIONS

Taiwanese language office action dated Feb. 20, 2014.  
English language translation of abstract of TW 201017592 (published May 1, 2010).  
English language translation of abstract of TW 201103786 (published Feb. 1, 2011).  
English language translation of abstract of TW M410314 (published Aug. 21, 2011).

* cited by examiner

*Primary Examiner* — Etienne Leroux  
(74) *Attorney, Agent, or Firm* — McClure, Qualey & Rodack, LLP

(57) ABSTRACT

Accident information aggregation and management methods are disclosed. The Accident information aggregation and management method includes receiving an accident information from a first server, wherein the accident information includes a time information and a position information for an accident; searching whether any event data that is nearby the time information and the position information can be found in a database; if so, obtaining at least one witness information and evidence data source according to the found issue data; and providing the at least one witness information and evidence data source to the first server such that the first server can use the at least one witness information and evidence data source for further accident investigation.

10 Claims, 5 Drawing Sheets

ACCIDENT INFORMATION AGGREGATION AND MANAGEMENT SYSTEMS AND METHODS FOR ACCIDENT INFORMATION AGGREGATION AND MANAGEMENT THEREOF

CROSS REFERENCE TO RELATED APPLICATIONS

This Application claims priority of Taiwan Patent Application No. 100135467, filed on Sep. 30, 2011, the entirety of which is incorporated by reference herein.

BACKGROUND OF THE INVENTION

1. Field of the Invention

The disclosure relates generally to accident information aggregation and management systems and related accident information aggregation and management methods, and, more particularly to accident information aggregation and management systems and related accident information aggregation and management methods using the same capable of providing accident investigators to quickly and automatically collect all witness information and evidence data responsive to the accident through a remote server and to provide a scene simulation for the accident provide evidence of the accident scene simulation so as to accelerate the processing of subsequent accident investigation work.

2. Description of the Related Art

In general, the general public may have witnessed an accident event or experienced an accident themselves, such as the car accident in everyday life occasionally. For example, Mr. A may find two cars suddenly colliding in front while driving through an intersection or Miss B may witness the occurrence of a serious road accident while walking home. In such situations, Mr. A and Miss B may report to the authority such as the police agencies and request the treatment for the accident event as soon as possible. The police may then be able to handle the situation only after having been notified of the accident and begin to collect related statements of the witnesses and evidence information for accident investigation work.

However, the witnesses and evidence information must be collected manually by the investigators, requiring a lot of resources and time. In addition, time may often be wasted on the collection of irrelevant witnesses and physical evidences, or some important evidences may be missed, thereby extending the time needed for the accident investigation operations. Moreover, even if all evidences about the accident have been collected, the investigators cannot quickly reconstruct the accident scene. Evidences must be organized with a lot of manpower and time before it can be used to reconstruct the scene, causing inconvenience on the accident investigation work.

It is therefore a desire to provide accident data integration and management systems and methods to quickly and automatically collect all relevant information of witnesses and evidences and provide accident scene simulation.

BRIEF SUMMARY OF THE INVENTION

Accident information aggregation and management systems and related accident information aggregation and management methods using the same are provided to quickly and automatically collect all witness information and evidence data responsive to the accident event and to provide a scene simulation for the accident event.

In one embodiment, an accident information aggregation and management method for use in an accident information aggregation and management system comprising a first server, a second server and at least one evidence data source is provided. The method comprises the steps of: the first server receiving an accident information from a second server, wherein the accident information includes time information and position information for an accident event; the first server finding at least one event record with time information and a position information that are correspond to the time information and the position information of the accident information from a database, wherein the database includes a plurality of event records and each of the event records includes time information and position information; the first server obtaining at least one witness information and at least one evidence data source according to the found event record; and the first server providing the at least one witness information and evidence data source to the second server such that the second server utilizes the at least one witness information and evidence data source for further accident investigation.

An embodiment of an accident information aggregation and management system comprises at least one evidence data source, a first server and a second server. The at least one evidence data source provides an event record, wherein the event record includes a time information and a position information. The first server receives an accident information including a time information and a position information for an accident event from a second server, finds at least one event record with a time information and a position information that are nearby the time information and the position information from a database, obtains at least one witness information and at least one evidence data source according to the found event record, and provides the at least one witness information and evidence data source to the second server such that the second server utilizes the at least one witness information and evidence data source for further accident investigation, wherein the database includes a plurality of event records and each of the event records includes a time information and a position information.

Accident information aggregation and management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide an accident (such as traffic accident) data integration and management system and data management method that enable the person responsible for the investigation of the accident (such as police officers) to simply operate their portable electronic devices (such as mobile phone) or to know what other accidents occurred in the specific time interval through an interface, thereby quickly finding effective witnesses and relevant evident data sources, so as to facilitate subsequent identification and investigation of the accidents.

Figure 1:
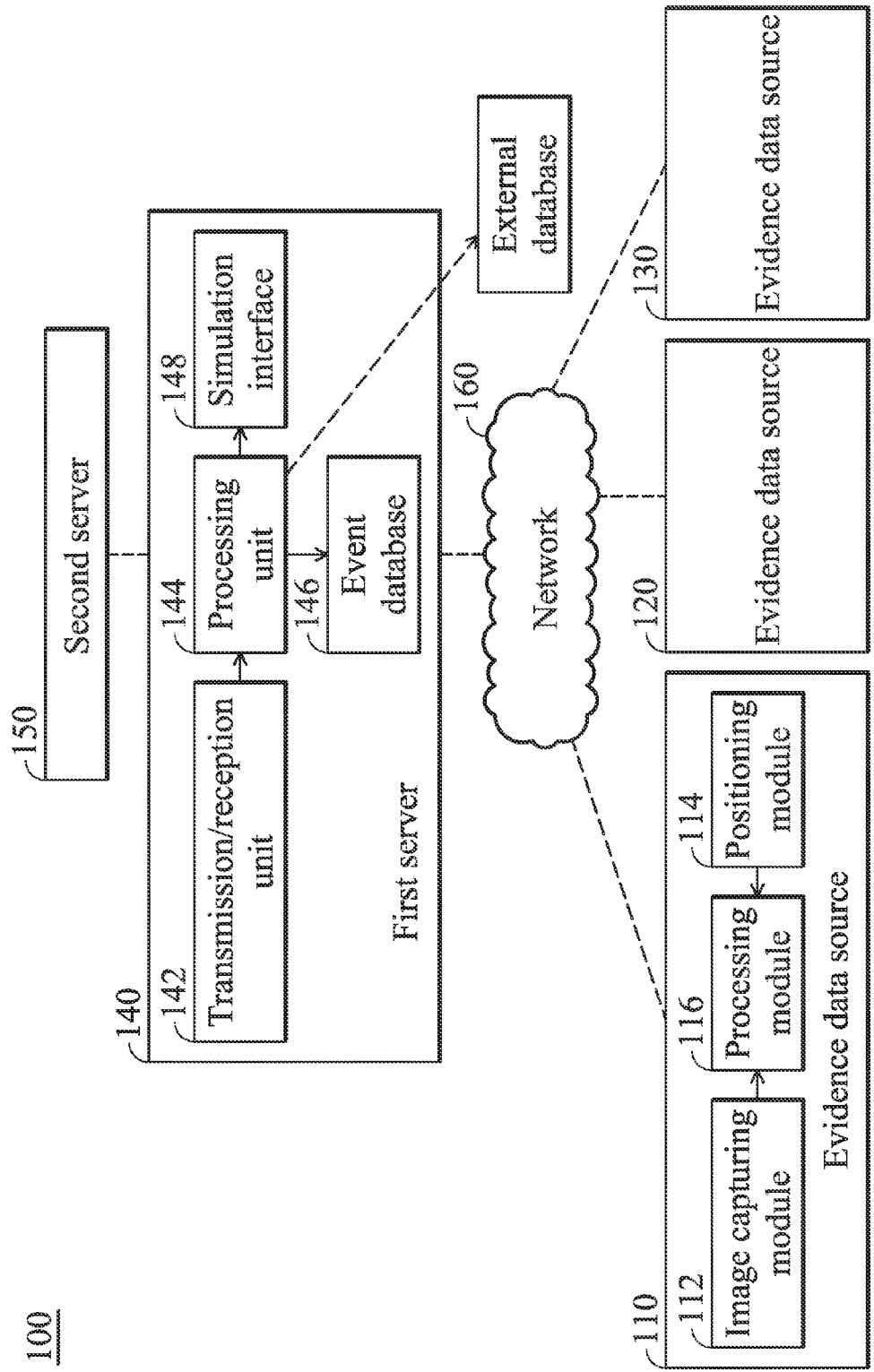
FIG. 1 is a schematic diagram illustrating an embodiment of an accident information aggregation and management system of the invention.

FIG. 1 is a schematic diagram illustrating an embodiment of an accident information aggregation and management system of the invention. The accident information aggregation and management system 100 of the invention at least comprises a plurality of evidence data sources 110, 120 and 130, a first server 140, a second server 150 and a network 160. The evidence data sources 110, 120, and 130 may communicate with the second server 150 for performing data transmission between each other through the network 160. The first server 140 may communicate with the second server 150 for performing data transmission between each other through any types of wired or wireless connections. The evidence data sources may comprise a portable device. For example, the evidence data sources may be portable devices or hand-held devices, such as mobile phones, smart phones, PDAs (Personal Digital Assistant), navigation devices used in car, drive recorders, or other electronic devices with information transmission capability and image capturing capability. In some embodiments, the evidence data sources may be some of the image capturing devices, such as the monitoring device setting in a fixed position, e.g. the surveillance camera setting at the intersection or building. The network 160 may be any type of wired or wireless networks, such as Internet, Ethernet, Wireless local area network (WLAN) or other types of wireless networks which are in compliance with 2G, 3G, 3.5G, 4G or WiMax communication protocols and others. In other words, the evidence data sources 110, 120 and 130 may perform a data transmission operation with the first server via a wireless connection link. In one embodiment, the evidence data source 110 can be the hand-held mobile phone of pedestrians near the accident site, the evidence data source 120 can be the drive recorder on a vehicle near the accident site, and the evidence data source 130 can be the surveillance cameras at the intersection near the accident site. It is to be noted that the number of evident data sources included in the accident information aggregation and management system 100 can be any value and it is not limited to the three of this embodiment.

Each of the evidence data sources may further comprise an image capturing module, a positioning module, and a processing module, all with the same functions. The following is illustrated with the evidence data source 110 as an example, and the evidence data sources 120 and 130 can be recognized in the same way. The evidence data source 110 may include at least an image capturing module 112, a positioning module 114, and a processing module 116, wherein both the image capturing module 112 and the positioning module 114 are connected to the processing module 116.

In this embodiment, the image capturing module 112 of the evidence data source 110 is used for capturing the image information about an event. In some embodiments, the image capturing module 112 may include cameras and/or video cameras, and the image information can include photos and/or video. For example, when a user finds the accident of the car crash while driving through the intersection, the user can operate his mobile phone camera to take shot of the crash at this time. In addition, the image capturing module 112 may further comprise an image encoder (not shown) for encoding images captured by the camera and the video camera.

When the image capturing module 112 captures the image information about the accident, the positioning module 114 may receive the positioning information about the evidence data source 110. To be more specific, the positioning module 114 may receive the positioning information from a positioning system, and the positioning information may include the positioning information and corresponding time information of the evidence data source 110, but it is not limited thereto. The positioning system may be a GPS (global positioning system), an AGPS (assisted global positioning system), a GLONASS (global navigation satellite system) or a Galileo Satellite Navigation System, but the invention is not limited thereto.

In addition, when the image capturing module 112 captures the image information about the accident, the processing module 116 may receive the time information of the accident from the positioning module 114. For example, when Mr. A sees traffic accidents, such as the collision of two cars, on the road in front and wants to make a report of the accident, Mr. A may simultaneously take a shot of or record the pictures or images of the accident using his image capturing unit and take the position information (such as latitude and longitude information) of the mobile phone received from the positioning system through the positioning module 114 and the time information (such as Central Standard Time, Jun. 13, 2011 at 14:35) when the photo was taken by the mobile phone camera as the additional summary information to record the information on the photos or images. Thereafter, when Mr. A notifies the authority such as the police agencies by his mobile phone, he can only transmit accident information including the time information, the position information, and the additional summary information to the second server 150.

In some embodiments, the portable device of the witnesses may further include an input module (not shown), such as a microphone, a keyboard and/or tablet, for the informer to enter the accident information about the accident. Therefore, the witnesses may enter the accident information such as text and/or sound and so on through the input module as the notes information of the image information of the accident. In addition, the processing module 116 may further include a wireless network connection unit (not shown) for establishing a link to the network 160 and then transmitting the accident information or an event record to the first server 140 and/or the second server 150 via the network 160.

The first server 140 may at least comprise a transmission/reception unit 142, a processing unit 144, an event database 146 and a simulation interface 148, wherein the processing unit 144 is coupled to the transmission/reception unit 142, the event database 146 and the simulation interface 148. In this embodiment, when the evidence data source 110 sends the accident record or the accident information to the second server 150 via the network 160, the second server 150 will simultaneously pass the accident record or the accident information to the first server 140. Then, the processing unit 144 may perform the analysis and comparison operations with the information stored in event database 146 based on the accident information received from the second server 150 to find at least one witness data and evidence data source corresponding to the accident information from an event database. When at least one witness data and evidence data source have been found, the first server 140 may return the at least one witness data and evidence data source and the relevant information such as a contact data for the witness and other position information of the evidence data sources to the second server 150 such that the investigators may obtain at least one witness data and evidence data source through the second server 150 to perform subsequent investigation work. In some embodiments, the second server 150 may be an authority server or a public server, such as the police reporting system server, but it is not limited thereto.

Figure 4A:
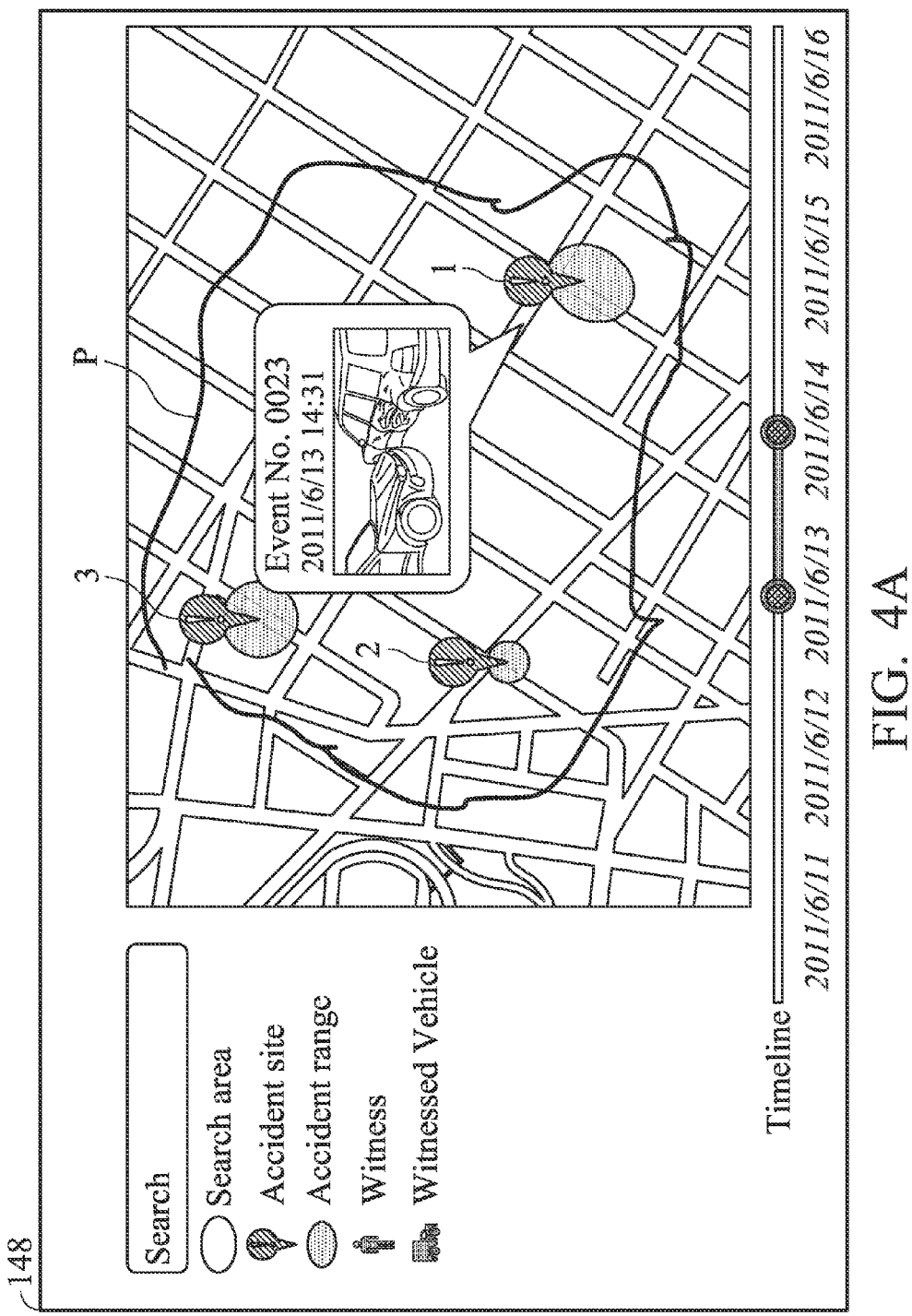
FIGS. 4A and 4B are schematic diagrams illustrating embodiments of scene simulation results of the invention.

The event database 146 may include a plurality of accident records, in which each accident record includes a time information, a position information, and other summary information. Specifically, the accident record may at least include the time information, the position information, and additional summary information of an accident event, in which the time information represents the time on which the accident occurred, the position information represents the accident site at which the accident occurred, and additional summary information may include other information about the accident such as accident type, accident severity, and whether there are any casualties or victims in the accident and so on. The simulation interface 148 is a user interface that displays an accident scene simulation picture which shows the information about the accident on the accident scene simulation picture through the various collected information about the witnesses and evidence for the investigators to perform operation and inspection. For example, the simulation interface 148 of the first server 140 may display the accident and the information corresponding to the accident on the displayed operation screen. The simulation interface 148 may further provide an interface for receiving a time interval input and a position range input and display all of accident information occurred within the inputted position range during the inputted time interval on the scene simulation picture. Please refer to FIG. 4A, which is an embodiment of the operation screen shown by the simulation interface 148 of first server 140. As shown in FIG. 4A, the position of the Accident 1 was marked on the map which is displayed on the right of the operation screen. When the operator points the cursor at the position of the Accident 1, the operation screen displays the information content corresponding to the Accident 1 for reference by the operator. Detail descriptions of the accident information aggregation and management method will be discussed further in the following paragraphs.

Figure 2:
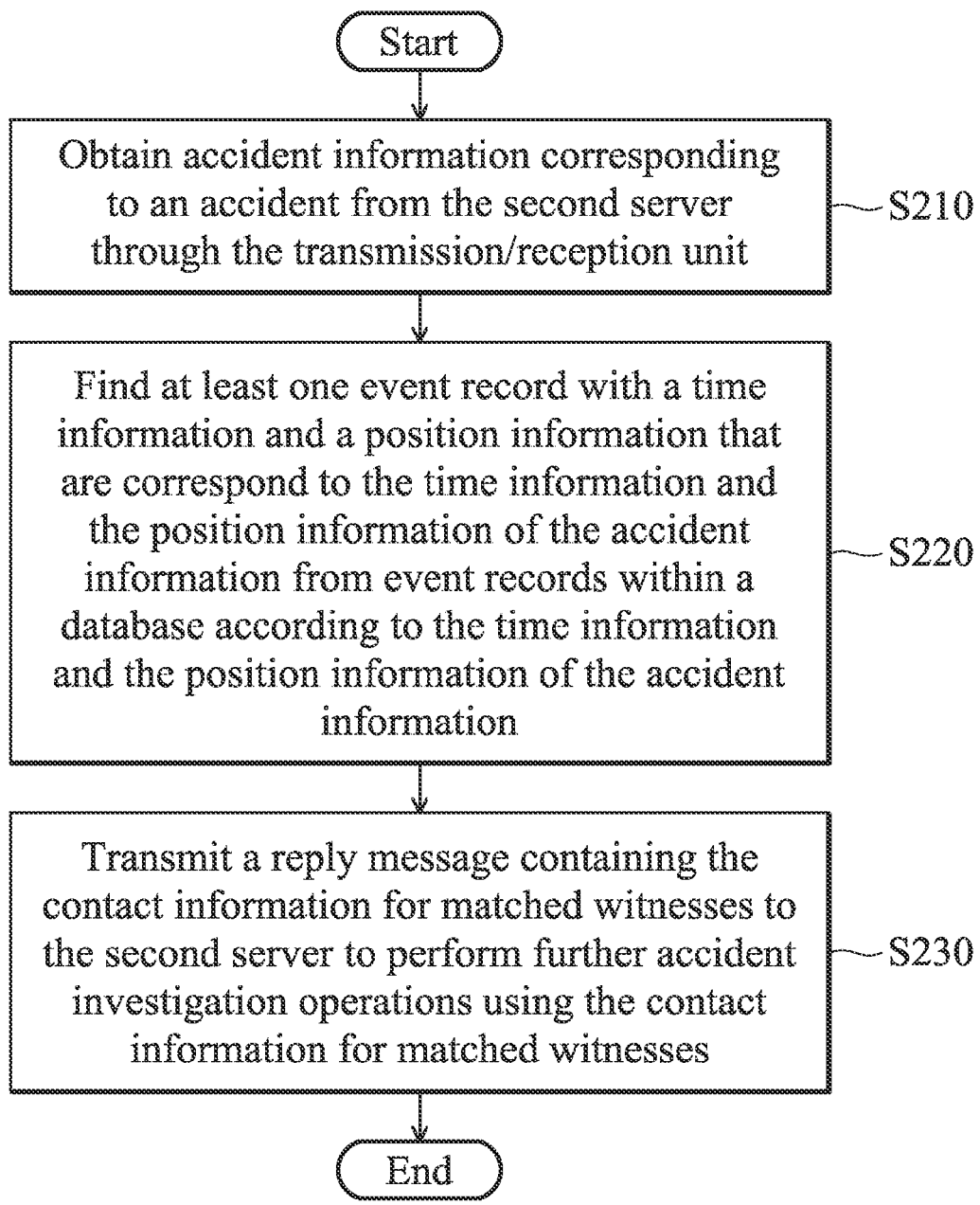
FIG. 2 is a flowchart of an embodiment of an accident information aggregation and management method of the invention.

FIG. 2 is a flowchart of an embodiment of an accident information aggregation and management method of the invention. The accident information aggregation and management method can be used in the accident information aggregation and management system as shown in FIG. 1 for determining witness corresponding to an accident. Please refer to FIGS. 1 and 2. First, when an accident, such as the traffic accident, has occurred and investigators arrive to handle it, the second server 150 of the authority, such as police units, may obtain a positioning information of the accident through a positioning system, wherein the position information includes the position information and the time information of the accident. The positioning system may be a GPS (global positioning system), an AGPS (assisted global positioning system), a GLONASS (global navigation satellite system) or a Galileo Satellite Navigation System, but the invention is not limited thereto. The second server 150 of the authority may then use this positioning information to generate an accident information. To be more specific, the accident information may include at least a time information, a position information, and additional summary information of an accident, wherein the time information represents the time on which the accident occurred, the position information represents the accident site at which the accident occurred, and additional summary information may include other information about the accident such as accident type, accident severity, and whether there are any casualties or victims in the accident and so on. In some embodiments, the second server 150 may be an authority server or a public server such as a server of the police office. However, it is to be understood that the invention is not limited thereto.

In step S210, the processing unit 144 of the first server 140 obtains an accident information corresponding to an accident from the second server 150 of the authority, such as the police office, through the transmission/reception unit 142. Note that the aforementioned accident information includes at least information about the accident, such as event records, time, position, and other information about the accident. It is understood that the investigators may know the type of accident and at what time and which place the accident has occurred and have a preliminary understanding about the accident situation based on the contents of the accident information.

When obtaining the accident data, in step S220, the processing unit 144 finds at least one event record with a time information and a position information that are correspond to the time information and the position information of the accident information from event records within a database according to the time information and the position information of the accident information. Note that the database may include a plurality of event records and each of the event records includes a time information and a position information for an accident event, wherein the sources of the position information may include volunteers or members who provide position information voluntarily, users who disclose their position data on the network and allow themselves to be searched, and specific external databases, such as databases of logistics systems, transportation systems and so on. The volunteers are the users who on their own initiative provide their position information for the investigation and may be witnesses near the accident. For example, the relative investigation unit can provide some real rewards as an incentive to make witnesses of the accident and enthusiastic individuals to become volunteers and voluntarily provide their position information and all the evidence information related to the accident event, such as photographs or video information related to the accident event to assist the relevant investigation unit for investigation. In this step, the step that the processing unit 144 of the first server 140 finds an accident record with the time and position information corresponding to the accident information based on the time information and position information of the accident information may be performed by comparing the time and position information of the accident with those provided by various volunteers/witnesses in the database to find whether any position information and time information of witnesses/volunteers are matched with or near the accident site and the accident time. For example, the processing unit 144 of the first server 140 may search for recorded volunteer information from its own database (i.e. the event database 146) to find whether any records that have a match, or search for position records from an external database, such as the database of a transport system, to find whether any records that have a match, or it may be connected to the network database to find whether any records that have a match, but the invention is not limited thereto.

When the event record showing the time and position near the accident is found in the event records of witnesses, which means that the witness corresponding to this event record may be one of the possible witnesses, in step S230, the processing unit 144 of the first server 140 transmits a reply message containing the information about the contact information for matched witnesses to the second server 150. The investigators may receive this reply message later through the second server 150 and find these witnesses to perform further accident investigation operations according to the contact information for matched witnesses contained in the reply message. For example, the police officers may contact found witnesses for the record of statement or inform those witnesses to provide relevant evidence such as information, images, and descriptions about the accident event.

In some embodiments, if the witness's identity corresponds to a vehicle (such as a bus or a vehicle of a freight company), then when it is found that a vehicle is matched with the request, the investigators may contact the driver of the vehicle to be a witness and require him to provide images records and other evidence information. For example, many of the specific company's vehicles (such as a bus or a freight company vehicle) are all equipped with the GPS positioning system to keep track of the time and position of his vehicle and with a drive recorder to record the image in front. Thus, when the first server 140 searches the external database and finds the position information of Car A corresponding to the position of the accident at the time on which the accident occurred, which means that the position of Car A at the accident occurred time was near the position of the accident, it may then transmit the contact information of the driver of the Car A, such as phone numbers and other information of the driver, to the second server 150. The investigators may then obtain the contact information of the driver of the Car A through the second server 150 and contact the driver of the Car A to proceed the statement record and require him to provide accident-related image information, i.e. the images recorded by the drive recorder on the Car A. In one embodiment, the external server may include a bus database, and the server may search a bus database to find the bus number of bus services whose bus route passing through the accident site and find whether any bus has just passed near the accident site. If so, the matched bus may be required to provide recorded images of its drive recorder as one of the evident data sources or the bus driver may be queried to obtain witness information related to the accident.

By doing so, the investigators can utilize the witness information sorted/collected by the first server 140 to quickly identify and filter out effective witness information, thus more effectively identifying the cause of the accident or determining the master key to solve the case.

In addition to the use of witness information to identify the witnesses, the processing unit 144 may further find effective evidence data sources in accordance with all of the possible evidence data sources and ask the evidence data sources found to provide the accident-related evidences.

Figure 3:
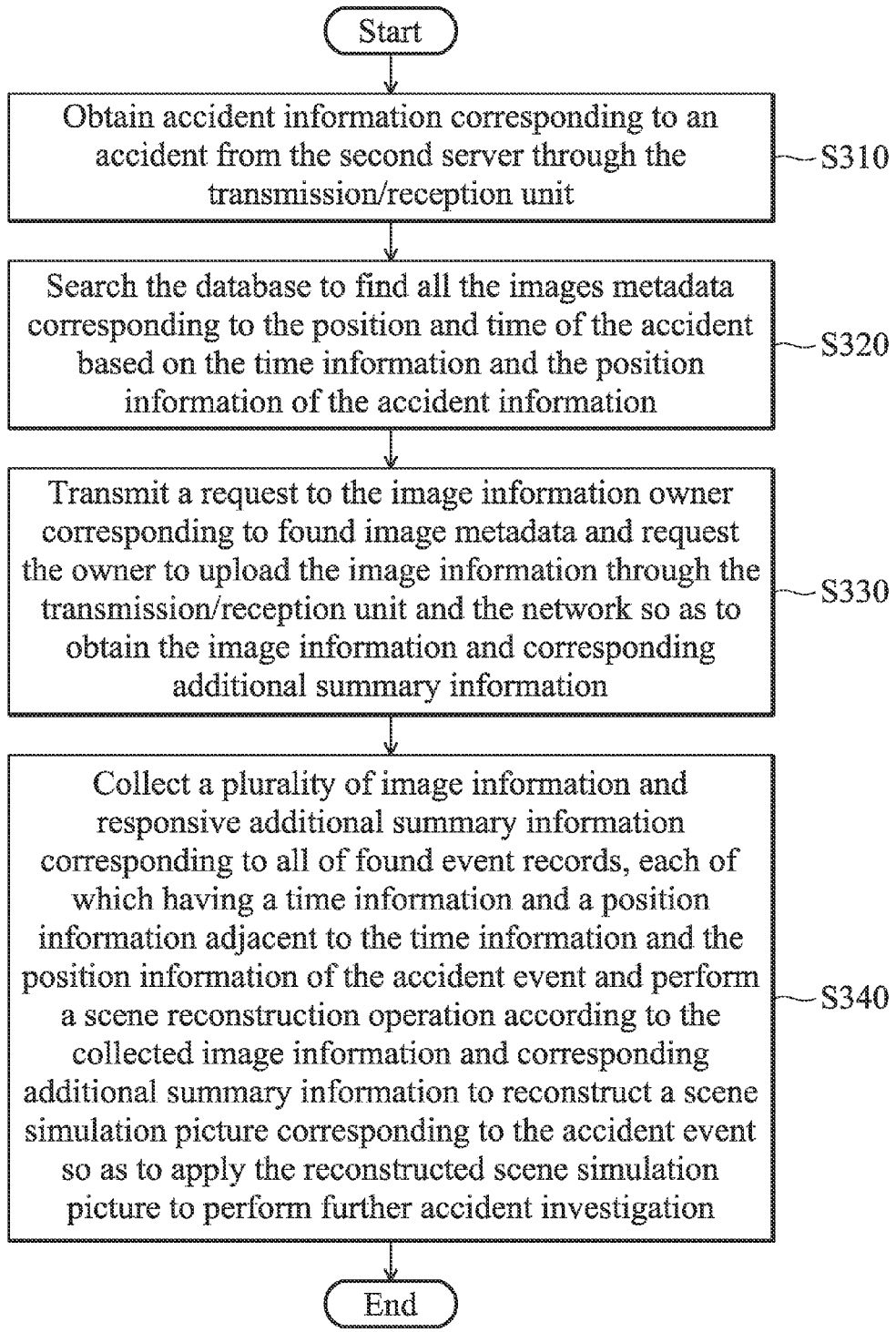
FIG. 3 is a flowchart of another embodiment of an accident information aggregation and management method of the invention.

FIG. 3 is a flowchart of another embodiment of an accident information aggregation and management method of the invention. The accident information aggregation and management method can be used in the accident information aggregation and management system as shown in FIG. 1 for determining evidence data sources corresponding to an accident event and obtaining effective witness information therefrom accordingly. Please refer to FIGS. 1 and 3.

In step S310, the processing unit 144 of the first server 140 obtains the accident information from the second server 150 (e.g. the police office server) through the transmission/reception unit 142. The aforementioned accident information includes accident event records, time information, position information, and other information. Then, in step S320, the processing unit 144 of the first server 140 searches the database to find all the images metadata corresponding to the position and time of the accident based on the time information and the position information of the accident information.

The image metadata is a descriptive data of the image information, which may contain time information, position information, or movement direction information, such as the sensor data (e.g. the electronic compass data) in inertial measurement device, shooting angles and so on, related to the image/video information to indicate what time, where and in which direction the image information was taken. In this step, the step that the processing unit 144 of the first server 140 searches the database to find all the images metadata corresponding to the position and time of the accident based on the time information and the position information of the accident information can be performed by comparing the position information and time information of the accident with the position information and the time information in the image metadata provided by each image information and finds whether or not the position information and time information in the image metadata are matched with or near the accident site and the accident time. It is to be noted that, in order to avoid sending a lot of useless image information and occupying limited resources, in this embodiment, when the witnesses discovered or witnessed the accident, they may first use the image capturing devices of their devices, such as cameras or video cameras, to record the related accident pictures or video clips, and store them in the storage unit of their device, and then only to upload the image metadata of accident photos or video clips to the first server 140 for inquiries.

Similarly, the processing unit 144 of the first server 140 may search for image metadata records from its own database (i.e. the event database 146) to find whether any records that have a match, or search for image metadata records from an external database, such as the database of a transport system, to find whether any records that have a match, or it may be connected to the network database to find whether any records that have a match, but the invention is not limited thereto.

Therefore, after the image metadata adjacent to the accident site and the accident time have been found, in step S330, the processing unit 144 of the first server 140 transmits a request to the image information owner corresponding to the found image metadata and requests the owner to upload the image information through the transmission/reception unit 142 and the network 160 so as to obtain the image information and the corresponding additional summary information. When the owner receives the request and agrees to the request of uploading the image, the image will be automatically uploaded to the first server 140 via the wireless connection. If the network connection is not established, the owner may then manually upload the images when access to the network is valid. Thus, the processing unit 144 of the first server 140 may respectively send a request for uploading images to the owner of each matched image metadata to collect all image information that may be useful as the evidence information.

After receiving all the required image information, in step S340, the processing unit 144 of the first server 140 then collects a plurality of image information and additional summary information corresponding to all of the found event records, wherein each of the found event records has a time information and a position information adjacent to the time information and the position information of the accident event and performs a scene reconstruction operation according to the collected image information and corresponding additional summary information to reconstruct a scene simulation picture that corresponds to the accident event using those effective evidence information and applies the reconstructed scene simulation picture to perform the further accident investigation. The first server 140 may display a reconstructed scene simulation picture for simulating the accident event through the simulation interface 148 and may map the witness information and the evidence data sources on responsive positions within the scene simulation picture of the accident event according to the responsive position information of the witness information and the respective position information of the evidence data sources for the relevant investigators to perform operation and inspection so as to facilitate in speeding up the subsequent accident investigation work. The reconstructed accident scenes may be displayed/presented in various forms, such as presented by a two-dimensional (2D) map mode (e.g. the Google™ map) or by a three-dimensional (3D) model mode (e.g. the Google™ street map). The processing unit 144 of the first server 140 may map all data on a simulation map of the accident scene based on all collected accident-related time information and position information. The processing unit 144 of the first server 140 may establish a link between all the data and the accident scenes to create an additional layer of information in the accident scene simulation picture for the investigation use to illustrate the correspondence between the data. The information related to an accident event may be shown on the corresponding position of accident scene simulation picture in accordance with the time information (e.g. the time stamp), the position information (e.g. the GPS coordination), the direction and perspective. When the information related to an accident event is presented with a 2D map, the operators can move horizontally and vertically on the 2D map. When the accident information is presented with a 3D model, the operators can perform the 360-degree field operations on the 3D model shown. For example, in reconstruction of a specific scene, the reconstruction of 2D or 3D of the accident scene simulation picture mapped at least the following information: video evidence information, witness information, such as the position of pedestrians/witness, peripheral vehicle information, additional information such as pictures, sketches, comments, annotation information and other relevant documents, as well as victim and other information, but the invention is not limited thereto. The processing unit 144 of the first server 140 may further form a 360-degree surround image based on the image metadata of each image information, and the chronological order, the positions, and the directions of all the image metadata so as to more realistic simulation of the accident scenes to help subsequent accident investigation.

Figure 4B:
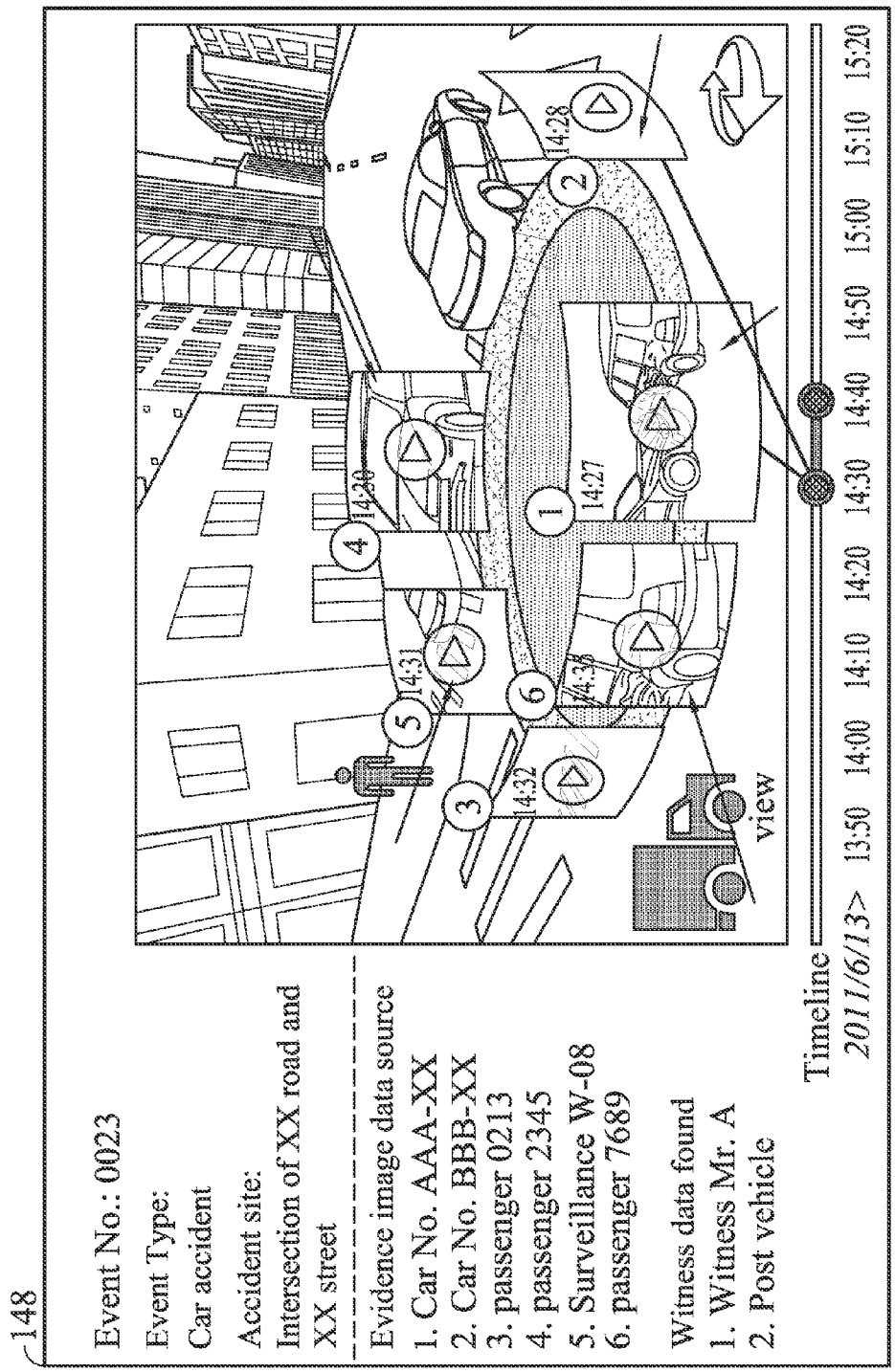

For example, please refer to FIGS. 4A and 4B. FIGS. 4A and 4B are schematic diagrams illustrating embodiments of scene simulation results of the simulation interface 148 of the invention. FIG. 4A shows a reconstructed 2D accident scene simulation picture, which shows the accident information occurred at the specified region P on Jun. 13, 2011 to Jun. 14, 2011 in the time period of 2, wherein it shows respectively the sites of Accident 1, Accident 2 and Accident 3 occurred and the position of witnesses and vehicles. When the police want to investigate the Accident 1, they can click on the graphic mark representing the Accident 1 on the 2D scenes map and the simulation interface 148 will display the collection of evidence data about the Accident 1, such as position of witnesses, accident photographs or film, and so on. FIG. 4B shows a reconstructed 3D accident scene simulation picture, which shows all image information collected on the time period between Jun. 13, 2011 at 14:30 and Jun. 13 2011 at 14:40in the specified position of the accident 1. In this 3D accident scene simulation picture, the operator can click each clickable item on the screen of the simulation interface 148 to check the details of each item and can also rotate the viewpoint to observe the scene from different perspectives. When the investigators want to investigate the Accident 1, they can click the icon mark representing the Accident 1 on the 3D accident scene simulation picture, whereby the simulation interface 148 will display the collected image data about the Accident 1. Investigators can then selectively view part or all of the image information so as to quickly perform the evidence collection operations.

In one embodiment, when the witness information corresponds to a vehicle, the track of the moving vehicle can indicate from which direction of the scene simulation picture the image was taken. For example, the device on the vehicle may continually capture images and record the information position and time information of the images. Therefore, if the device on the vehicle is moved from position a to position b at time point a to point b, when the first server 140 receives the images and responsive metadata, it may calculate the time difference and the position difference therebetween to estimate the moving direction of the vehicle corresponding to the device on the vehicle and calculate the direction of the image. Then, the position it is seeking is determined and shown on the accident scene simulation picture. To be more specific, the moving direction of the vehicle may indicate whether the vehicle was near an accident site. In general, each image information can be marked on a 2D map in accordance with the position indicated by its position information or can be marked in a 3D model according to its direction and perspective information to present a more accurate evidence to the relevant investigation personnel, such as police officers, for further investigation. In one embodiment, if the device of the witness includes inertial measurement units, such as an electronic compass and an accelerator, the inertial measurement units may also be used to determine an actual moving direction for the image, wherein the electronic compass may be used to obtain a moving direction of a traced object (e.g. a vehicle) and the accelerator may be used to obtain an acceleration of the traced object. The obtained moving direction and acceleration of the traced object may further be used to estimate a moving distance for the traced object. Furthermore, the inertial measurement units may further comprise a gyroscope for obtaining angular variation information of the traced object. With the gyroscope, the moving direction of the traced object may be obtained more precisely. In some embodiments, the processing unit 144 of the first server 140 may further analyze the contents of the images through the image processing and image recognition technology to determine the direction of movement of the traced object and related perspective. For example, landmark information of the image, such as specific buildings within the image, can be first analyzed and then the direction of its movement and video shooting angle can be determined based on the position relationship between it and landmark information.

Therefore, compared with the prior art, with the accident information aggregation and management systems and related data management methods of the invention, when receiving an accident report, the server-end can quickly find, based on the time information and position information at the occurrence of the accident indicated by the accident report, witnesses candidates and evidence data sources adjacent to the position as the position information indicated and collect the relative evidence information, thereby effectively assisting in subsequent accident investigation operations. In addition, the accident information aggregation and management system of the invention can also provide a simulation interface to display the time and position of accident information recorded within a specific time interval and the specific position and present the relevant witnesses' information and evidence information by the form of the two-dimensional map or three-dimensional surround images to reconstruct the scenes simulation such that the executive officers for investigating the accident can easily determine and observe all the evidence, thus greatly speeding up the investigation work and responsibility identification for the accident.

Accident information aggregation and management methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An accident information aggregation and management method for use in an accident information aggregation and management system comprising a first server, a second server and at least one evidence data source, the method comprising:
   the first server receiving an accident information from the second server, wherein the accident information includes time information and position information for an accident event;
   the first server finding at least one event record with time information and position information that are correspond to the time information and the position information of the accident information from a database, wherein the database includes a plurality of event records and each of the event records includes time information and position information;
   the first server obtaining at least one witness information and at least one evidence data source according to the found event record; and
   the first server providing the at least one witness information and evidence data source to the second server such that the second server utilizes the at least one witness information and evidence data source for further accident investigation,
   wherein the method further comprises:
   the first server collecting a plurality of image information and additional summary information corresponding to all of the found event records, wherein each of the found event records has time information and position information close to the time information and the position information of the accident event;
   performing a scene reconstruction operation for reconstructing a scene simulation picture that corresponds to the accident event according to the collected image information and corresponding additional summary information; and
   applying the reconstructed scene simulation picture to perform the further accident investigation.

2. The accident information aggregation and management method of claim 1, wherein the witness information is a contact data for a witness, a vehicle data that position information is nearby the position information of the accident event, and/or data for an image capturing device.

3. The accident information aggregation and management method of claim 1, wherein the step of the first server obtaining at least one witness information and at least one evidence data source according to the found event record further comprises:
   transmitting a request to each of the at least one evidence data source for requesting each of the at least one evidence data source to upload the image information corresponding to the time information and the position information of an accident record as the evidence data source.

4. The accident information aggregation and management method of claim 1, wherein the scene simulation picture is presented by a two-dimensional (2D) map mode or by a three-dimensional (3D) street scene mode.

5. The accident information aggregation and management method of claim 1, wherein the step of performing the scene reconstruction operation for reconstructing the scene simulation picture that corresponds to the accident event further comprises:
   mapping the witness information and the evidence data sources on responsive positions within the scene simulation picture of the accident event according to the responsive position information of the witness information and the respective position information of the evidence data source.

6. The accident information aggregation and management method of claim 1, further comprising:
   providing an interface for receiving a time interval input and a position range input and displaying all of accident information occurred within the inputted position range during the inputted time interval on the scene simulation picture.

7. The accident information aggregation and management method of claim 1, wherein the second server is an authority server or a public server.

8. The accident information aggregation and management method of claim 1, wherein the database comprises an external database that is located external to the accident information aggregation and management system.

9. The accident information aggregation and management method of claim 8, wherein the evidence data source comprises a portable device and/or an image capturing device.

10. An accident information aggregation and management system, comprising:
    at least one evidence data source, providing an event record, wherein the event record includes time information and position information;
    a first server; and
    a second server;
    wherein the first server receives accident information including time information and a position information for an accident event from the second server, finds at least one event record with time information and position information that are correspond to the time information and the position information of the accident information from a database, obtains at least one witness information and at least one evidence data source according to the found event record, and provides the at least one witness information and evidence data source to the second server such that the second server utilizes the at least one witness information and evidence data source for further accident investigation, wherein the database includes a plurality of event records and each of the event records includes time information and position information and wherein the first server further collects a plurality of image information and additional summary information corresponding to all of the found event records, wherein each of the found event records has time information and position information close to the time information and the position information of the accident event, performs a scene reconstruction operation for reconstructing a scene simulation picture that corresponds to the accident event according to the collected image information and corresponding additional summary information and applies the reconstructed scene simulation picture to perform the further accident investigation.

\* \* \* \* \*